United States Patent [19]
Nara

[11] 3,977,263
[45] Aug. 31, 1976

[54] INTERMITTENTLY ROTATING DRIVING DEVICES

[76] Inventor: Shigetoshi Nara, 3-6-32, Kameido, Koto, Tokyo, Japan

[22] Filed: July 1, 1975

[21] Appl. No.: 592,266

[52] U.S. Cl. .................................. 74/129; 74/88; 74/569
[51] Int. Cl.² ..................................... F16H 27/02
[58] Field of Search ........... 74/129, 128, 88, 126, 74/55, 569

[56] References Cited
UNITED STATES PATENTS

| | | | |
|---|---|---|---|
| 3,161,070 | 12/1964 | Venables | 74/129 |
| 3,590,645 | 7/1971 | Magri et al. | 74/88 |
| 3,869,928 | 3/1975 | Ishii et al. | 74/88 |

*Primary Examiner*—Benjamin W. Wyche
*Assistant Examiner*—F. D. Shoemaker
*Attorney, Agent, or Firm*—Fleit & Jacobson

[57] ABSTRACT

The driving device comprises a cam disc rotatably supported by a cylindrical base and provided with equally spaced radial cam grooves of an add number, a slidable shaft extending through the cylindrical base in the diametrical direction thereof, and a pin secured to the slidable shaft for cooperating with the cam groove is shaped to lock the pin, and the marginal line between two sides of adjacent cam grooves are displaced from diametrical lines passing through the centers of respective outer ends of the cam grooves.

2 Claims, 11 Drawing Figures

INTERMITTENTLY ROTATING DRIVING DEVICES

BACKGROUND OF THE INVENTION

This invention relates to an intermittently rotating driving device utilizing a plate cam.

A Geneva wheel, ratchet wheel or one way clutch or the like has been used as an intermittently rotating driving mechanism for use in machine tools or the like. However, the accuracy of the stopping position of such prior art mechanism is not high so that it is necessary to use an independent positioning mechanism. Moreover, as the rotational speed of the mechanism is uniform shocks are imparted to the mechanism due to the inertia of the rotary parts when the driving mechanism is stopped, thereby shortening the useful life of the mechanism. To obviate this difficulty, a barrel cam was proposed but with such barrel cam it is impossible to vary the number of indexes or the number of stops in one complete revolution of 360°. In addition, manufacture of such barrel cam is extremely difficult and expensive.

SUMMARY OF THE INVENTION

Accordingly, it is an object of this invention to provide an improved intermittently rotating driving device capable of obviating difficulties described above.

According to this invention there is provided an intermittently rotating driving device comprising a cylindrical base, a cam disc rotatably supported by the cylindrical base and provided with a plurality of equally spaced radial cam grooves of an odd number, a slidable shaft extending through the cylindrical base in the diametrical direction thereof, and a pin secured to the slidable shaft for cooperating with the cam grooves. The outer end of each cam groove is shaped to lock the pin, and the marginal lines between two sides of adjacent cam grooves are displaced from diametrical lines passing through the centers of respective outer ends of the cam grooves. Each cam groove comprises a substantially straight side and a curved side which are interconnected by a semicircle having a radius slightly larger than that of the pin.

BRIEF DESCRIPTION OF THE DRAWINGS

The invention can be more fully understood from the following detailed description taken in conjunction with the accompanying drawings in which.

DESCRIPTION OF THE PREFERRED EMBODIMENTS

Figure 1:
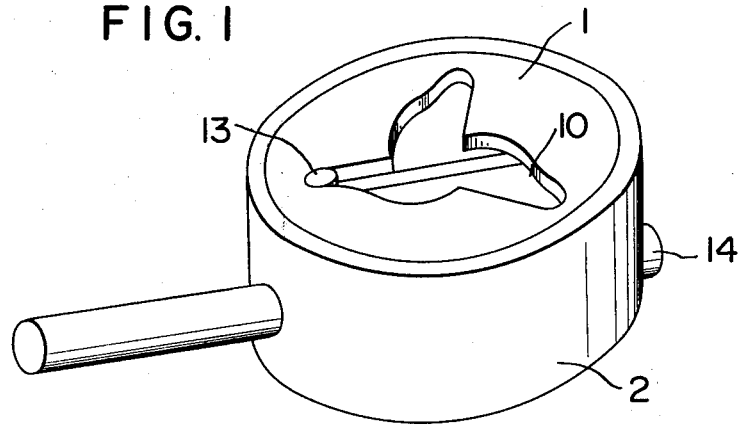
FIG. 1 shows a perspective view of one embodiment of the intermittently rotating driving device constructed in accordance with this invention.
Figure 2:
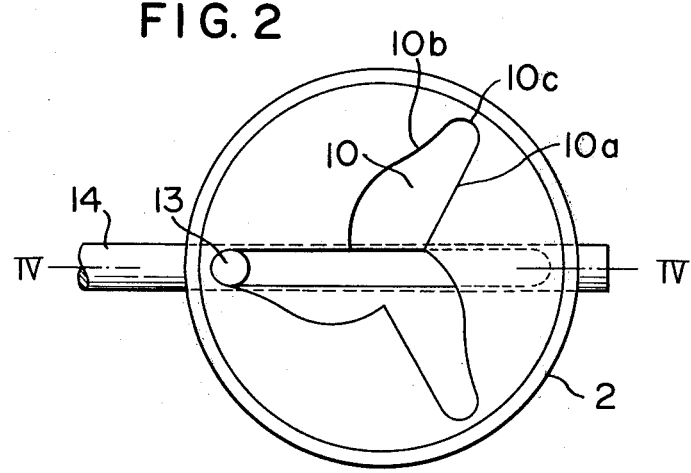
FIG. 2 is a top plan view of the driving device shown in FIG. 1.
Figure 3:
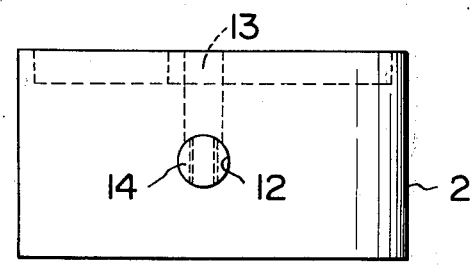
FIG. 3 is a side view of the driving device.
Figure 4:
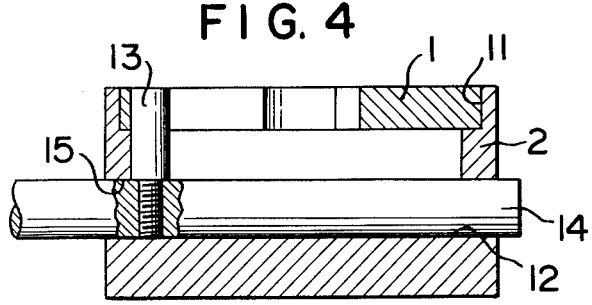
FIG. 4 is a sectional view of the driving device shown in FIG. 2 taken along a line IV—IV.

A preferred embodiment of this invention shown in FIGS. 1 to 4 of the accompanying drawing comprises a circular cam disc 1 fitted in the upper recess 11 of a cylindrical casing or base 2. In the illustrated example, the cam disc 1 is provided with three equally spaced radial grooves to each having a straight side 10a and somewhat curved side 10b. Extending through the center of the recess 11 is an elongated groove 12 for slidably receiving a slidable shaft 14 to which a cam pin 13 is secured as by screw threads to be reciprocated therewith. The slidable shaft 14 is received in openings 15 extending in the same direction as the elongated groove 12. When the cam disc 1 is fitted in the recess 11 of the casing 2, the head of the cam pin 13 will be received in one of the cam grooves 10.

Figure 5A:
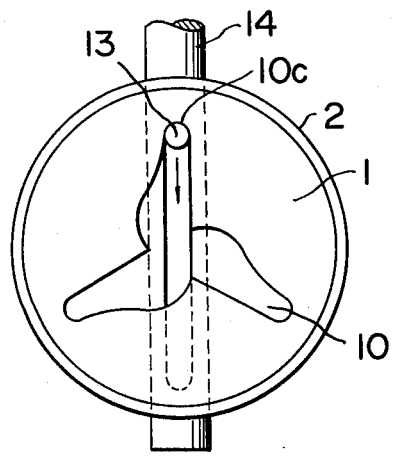
FIG. 5A through 5D are plan views of the intermitting rotating driving device showing successive steps of rotation of the cam disc.
Figure 5B:
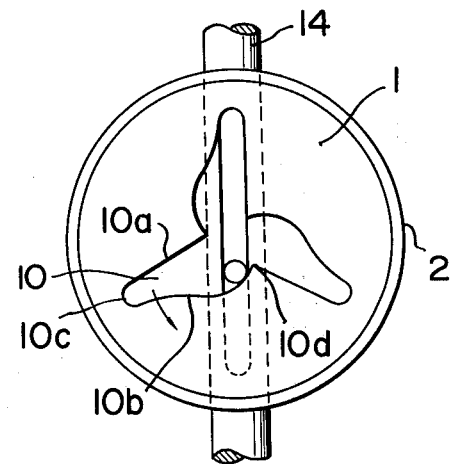
Figure 5D:
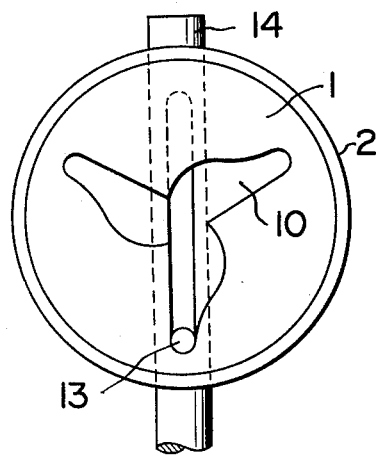
Figure 5C:
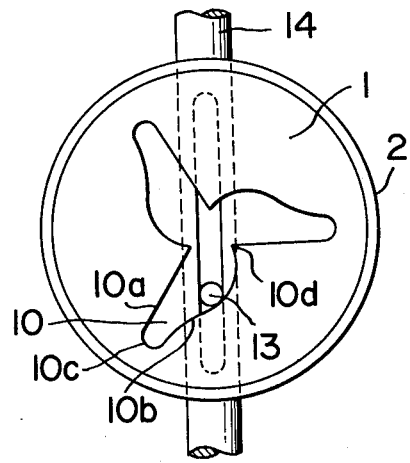
Figure 6A:
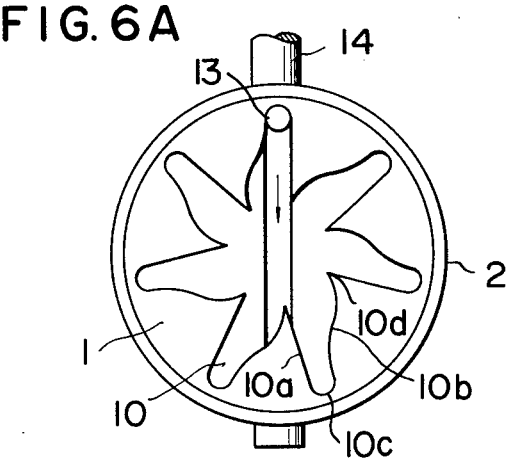
FIG. 6A, 6B and 6C are views similar to FIGS. 5A, 5B and 5C showing a modified embodiment of this invention in which the cam disc is provided with seven cam grooves.
Figure 6B:
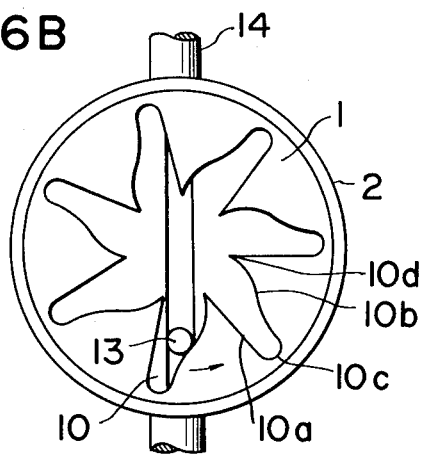
Figure 6C:
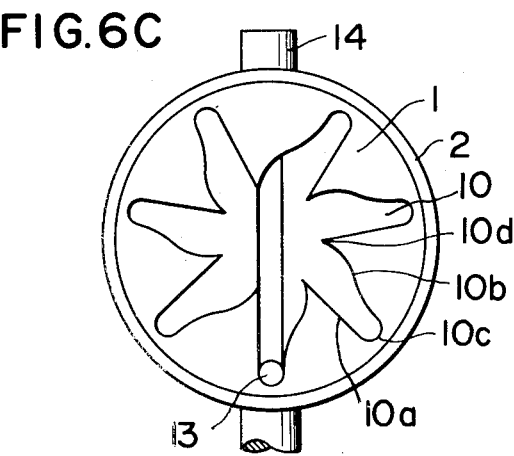

In operation, the slidable shaft is reciprocated manually or by a driving device, for example a cylinder for intermittently rotating the cam disc 1. More particularly, when the cam pin 13 is moved downwardly from the outer end 10c of the groove 10 as shown in FIG. 5A to the position shown in FIG. 5B during which the cam pin engages the curved side 10b of another groove 10. The cam grooves 10 are designed such that the merging line or edge 10d between the straight and curved sides of adjacent grooves will be positioned a short distance to the right of the center line of the slidable rod 14 when the device assumes a position shown in FIG. 5B. Consequently, the cam disc 1 is rotated in the counter-clockwise direction until the pin engages the outer end 10c of the groove as shown in FIG. 5c. Thus, the disc is rotated 90°. By machining the outer end 10c of each cam groove 10 such that the pin 13 firmly fits in the outer end, the cam disc 10 can be locked at the position shown in FIG. 5D. Then, when the rod 14 is moved in the opposite direction an operation similar to that described above is performed thus rotating the disc 1 by additional 90°. In this manner, by reciprocating the slidable rod 14, the cam disc is intermittently rotated 90° and locked in the operated positions. As shown in FIGS. 5A and 5D the cam plate 1 is locked when the pin 13 engages the outer end of the groove 10, so that it is not necessary to provide any independent positioning mechanism for the intermittently rotating driving device. Moreover, the accuracy of the indexing positions is determined by the positional accuracy of the outer ends 10c of the cam grooves. High positional accuracy same as that of a master cam, not shown, can readily be attained by securing a cam disc on an intermittently driven table provided with the master cam having a high degree of stopping positional accuracy, intermittently driving the table and accurately machining the outer ends 10c of the cam grooves. Such method of machining provides accurate cam discs at a relatively low cost. By making the curved side 10b of the groove to have suitable contour along which the pin 13 moves it is possible to minimize the shock caused by the inertia at the time of stopping the pin. By increasing the number of the radial cam grooves it is possible to increase the number of indexing positions provided by one stroke or reciprocating motion of the slidable rod 14. However, the number of the radial cam grooves should be an odd number, such as 3, 5, 7, etc. FIGS. 6A, 6B and 6C show successive steps of rotation of the cam plate of a modified embodiment in which the cam plate is provided with seven cam grooves.

It should be understood that the invention is not limited to the specific embodiments described above and that many changes and modifications will be obvious to one skilled in the art without departing from the true spirit and scope of the invention as defined in the appended claims.

I claim:

1. An intermittently rotating driving device comprising a cylindrical base, a cam disc rotatably supported by said cylindrical base and provided with a plurality of equally spaced radial cam grooves of an odd number, a slidable shaft extending through said cylindrical base in the diametrical direction thereof, and a pin secured to said slidable shaft for cooperating with said cam grooves, the outer end of each cam groove being shaped to lock said pin, and the marginal lines between two sides of adjacent cam grooves being displaced from the diametrical lines passing through the centers of respective outer ends of the cam grooves.

2. The intermittently rotating driving device according to claim 1 wherein each cam groove comprises a substantially straight side and a curved side which are interconnected by a semicircle having a radius slightly larger than that of said pin.

* * * * *